US008705429B2

(12) United States Patent
Xu

(10) Patent No.: US 8,705,429 B2
(45) Date of Patent: Apr. 22, 2014

(54) METHOD, APPARATUS AND SYSTEM FOR TRANSMITTING MULTIMEDIA BROADCAST MULTICAST SERVICE NOTIFICATION MESSAGE

(75) Inventor: Hui Xu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 104 days.

(21) Appl. No.: 13/257,994

(22) PCT Filed: Dec. 30, 2009

(86) PCT No.: PCT/CN2009/076286
§ 371 (c)(1),
(2), (4) Date: Oct. 10, 2011

(87) PCT Pub. No.: WO2011/038563
PCT Pub. Date: Apr. 7, 2011

(65) Prior Publication Data
US 2013/0051301 A1    Feb. 28, 2013

(30) Foreign Application Priority Data
Sep. 30, 2009 (CN) .......................... 2009 1 0174176

(51) Int. Cl.
*H04H 20/71* (2008.01)
*H04W 4/06* (2009.01)
*H04W 4/08* (2009.01)
*H04W 4/10* (2009.01)

(52) U.S. Cl.
CPC . *H04W 4/06* (2013.01); *H04W 4/08* (2013.01); *H04W 4/10* (2013.01)
USPC ......................................... 370/312; 370/310

(58) Field of Classification Search
CPC ............ H04W 4/06; H04W 4/08; H04W 4/10
USPC ................................... 370/310, 312, 323, 324
See application file for complete search history.

(56) References Cited

U.S. PATENT DOCUMENTS

| 2008/0232395 A1* | 9/2008 | Buckley et al. ............... 370/465 |
| 2009/0046617 A1* | 2/2009 | Tenny et al. .................. 370/312 |
| 2010/0048124 A1* | 2/2010 | Lee et al. ..................... 455/3.01 |

FOREIGN PATENT DOCUMENTS

| CN | 101400081 A | 4/2009 |
| CN | 101499895 A | 8/2009 |
| WO | 2007078172 A2 | 7/2007 |
| WO | 2008023928 A2 | 2/2008 |
| WO | 2008114883 A1 | 9/2008 |

OTHER PUBLICATIONS

3GPP R2-092897,"MBMS Notification", TSG-RAN WG2 Meeting #66, San Francisco, USA, May 4-8, 2009.
3GPP R2-093095,"Notification mechanism design for eMBMS", TSG-RAN WG2 #66, San Francisco, US, May 4-8, 2009.
International Search Report for PCT/CN2009/076286 dated Jun. 24, 2010.

* cited by examiner

*Primary Examiner* — Hassan Phillips
*Assistant Examiner* — Siren Wei
(74) *Attorney, Agent, or Firm* — Ling Wu; Stephen Yang; Ling and Yang Intellectual Property

(57) ABSTRACT

The present invention discloses a method, apparatus and system for transmitting a Multimedia Broadcast Multicast Service notification message, relates to the wireless communication field, and solves the problem that there is not a MBMS notification message transmission mechanism. The technical scheme of the present invention is: receiving a Radio Resource Control signaling, reading subframe configuration information of the MBMS notification message included in said Radio Resource Control signaling; and using a subframe selection rule corresponding to said subframe configuration information to receive said MBMS notification message. The technical scheme provided by the present invention is suitable for the MBMS service.

9 Claims, 2 Drawing Sheets

METHOD, APPARATUS AND SYSTEM FOR TRANSMITTING MULTIMEDIA BROADCAST MULTICAST SERVICE NOTIFICATION MESSAGE

TECHNICAL FIELD

The present invention relates to the wireless communication field, and particularly, to a method, apparatus and system for transmitting a Multimedia Broadcast Multicast Service (MBMS) notification message.

BACKGROUND OF THE RELATED ART

In order to efficiently utilize the mobile network resources, the 3rd Generation Partnership Project (3GPP) proposes MBMS service, and this service is a technique of transmitting data from one data source to a plurality of destinations, implementing sharing of network (including the core network and the access network) resources, and improving the utilization ratio of network resources (especially of air interface resources). The MBMS defined by the 3GPP is not only able to implement the pure text low speed message multicast and broadcast, but also able to implement the high speed multimedia service broadcast and multicast, and provides various rich video, audio and multimedia services, which undoubtedly complies with the trend of the future mobile data development, and provides a better service prospect for the development of 3G.

The features of the MBMS service are that the data quantity of the service is large, the duration of receiving the service by the user equipment is long, and the average data rate is constant. The above features determine that both of the MBMS service scheduling and the control signaling configuration are semi-static, namely both of MBMS service scheduling information and control signalling information remain unchanged in a long term, and the information is periodically sent through the Multicast Control Channel (MCCH), which is uniformly called MCCH information.

A MBMS notification message is for describing whether the MCCH information changes, and for a user equipment in an Idle mode, it is just required to monitor the MBMS notification message in order to know whether the MCCH information changes, thereby selectively receiving the MCCH information, namely only receiving new MCCH information when the MCCH information changes. Since the amount of information of the MBMS notification message is far less than that of the MCCH information, thus selectively receiving the MCCH information by the user equipment can save resources and reduce the power consumption efficiently.

Here, the MBMS notification refers to MCCH change notification.

In the implementation process of notifying the change situation of the MCCH information to the user equipment by the MBMS notification message, the following problems exist:

In the prior art, there is not a MBMS notification message transmission mechanism of sending the MBMS notification message from the network side to the user equipment.

SUMMARY OF THE INVENTION

The present invention provides a method, apparatus and system for transmitting a notification message, which solves the problem that there is not a MBMS notification message transmission mechanism.

A method for receiving a notification message, comprising:

receiving a Radio Resource Control signaling, reading subframe configuration information in a Multimedia Broadcast Multicast Service (MBMS) notification message included in said Radio Resource Control signaling; and using a subframe selection rule corresponding to said subframe configuration information to receive said MBMS notification message.

Furthermore, in the above method for receiving the notification message, said subframe selection rule is a fixed subframe selection rule, a default subframe selection rule or a dynamic subframe selection rule; before the step of receiving the Radio Resource Control signaling, and reading the subframe configuration information included in said Radio Resource Control signaling, said method for receiving the notification message further comprises:

when said subframe selection rule is said default subframe selection rule, configuring said default subframe selection rule, and said default subframe selection rule being to use a default subframe to receive said MBMS notification message;

when said subframe selection rule is said fixed subframe selection rule, configuring said fixed subframe selection rule, and said fixed subframe selection rule being to receive said MBMS notification message in a fixed subframe corresponding to said subframe configuration information;

when said subframe selection rule is said dynamic subframe selection rule, configuring said dynamic subframe selection rule, and said dynamic subframe selection rule being to receive said MBMS notification message in a subframe included in said subframe configuration information.

Furthermore, in the above method for receiving the notification message, said subframe configuration information is a rule serial number; before the step of receiving the Radio Resource Control signaling, and reading the subframe configuration information included in said Radio Resource Control signaling, said method for receiving the notification message further comprises:

when said subframe selection rule is said default subframe selection rule, allocating a serial number for said default subframe selection rule;

when said subframe selection rule is said fixed subframe selection rule, allocating a serial number for said fixed subframe selection rule.

Furthermore, in the above method for receiving the notification message, the step of receiving said MBMS notification message comprises: using a unicast subframe or a Multicast Broadcast Single Frequency Network (MBSFN) subframe to receive said MBMS notification message, where said unicast subframe is a paging subframe or a non paging subframe.

Furthermore, in the above method for receiving the notification message, said unicast subframe is a paging subframe, which is indicated by a system message; said MBSFN subframe is a first subframe bearing a Multicast Control Channel (MCCH) in a MCCH repeat period.

Furthermore, in the above method for receiving the notification message, said Radio Resource Control signaling is a Broadcast Control Channel (BCCH) message, or a Multicast Control Channel (MCCH) message, or a dedicated Radio Resource Control (RRC) message, or a Media Access Control (MAC) Control Element (CE).

A method for sending a notification message, comprising:
determining a subframe for sending a Multimedia Broadcast Multicast Service (MBMS) notification message, sending a Radio Resource Control signaling to a user equipment, including subframe configuration information in said Radio Resource Control signaling, and instructing said user equipment to use a subframe selection rule corresponding to said subframe configuration information to receive said MBMS notification message; and sending said MBMS notification message to said user equipment in said subframe for sending said MBMS notification message.

Furthermore, in the above method for sending the notification message, said Radio Resource Control signaling is BCCH message, or a MCCH message, or a RRC message, or a MAC CE; and said subframe is a unicast subframe or a MBSFN subframe.

A user equipment, comprising:

a configuration information reading module, configured to receive a Radio Resource Control signaling, and read subframe configuration information included in said Radio Resource Control signaling; and a Multimedia Broadcast Multicast Service (MBMS) notification message receiving module, configured to use a subframe selection rule corresponding to said subframe configuration information to receive said MBMS notification message.

Furthermore, the above user equipment further comprises:

a rule configuration module, configured to configure a fixed subframe selection rule, a default subframe selection rule or a dynamic subframe selection rule, and allocate a serial number for said default subframe selection rule and said fixed subframe selection rule.

A network side device, comprising:

a Radio Resource Control signaling sending module, configured to determine a subframe for sending a Multimedia Broadcast Multicast Service (MBMS) notification message, send a Radio Resource Control signaling to a user equipment, include subframe configuration information in said Radio Resource Control signaling, and instruct said user equipment to use a subframe selection rule corresponding to said subframe configuration information to receive said MBMS notification message; and a MBMS notification message sending module, configured to send said MBMS notification message to said user equipment in said subframe for sending said MBMS notification message determined by said Radio Resource Control signaling sending module.

A system for transmitting a notification message, comprising a user equipment and a network side device;

said user equipment being configured to receive a Radio Resource Control signaling sent by said network side device, read subframe configuration information included in said Radio Resource Control signaling, and use a subframe selection rule corresponding to said subframe configuration information to receive a Multimedia Broadcast Multicast Service (MBMS) notification message;

said network side device being configured to determine a subframe for sending said MBMS notification message, send said Radio Resource Control signaling to said user equipment, include said subframe configuration information in said Radio Resource Control signaling, and instruct said user equipment to use the subframe selection rule corresponding to said subframe configuration information to receive said MBMS notification message, and send said MBMS notification message to said user equipment in said subframe for sending said MBMS notification message.

The examples of the present invention provide a method, apparatus and system for transmitting a MBMS notification message, a subframe selection rule is pre-configured, and the network side determines the subframe for sending the MBMS notification message, and notifies the subframe configuration information for use by the MBMS notification message to the user equipment by the Radio Resource Control signaling; the network side device sends the MBMS notification message in the subframe for use by the MBMS notification message, and the user equipment selects the corresponding subframe selection rule, receives the MBMS notification message according to this rule, implements the transmission of the MBMS notification message, and solves the problem that there is not a MBMS notification message transmission mechanism.

PREFERRED EMBODIMENTS OF THE PRESENT INVENTION

Figure 1:
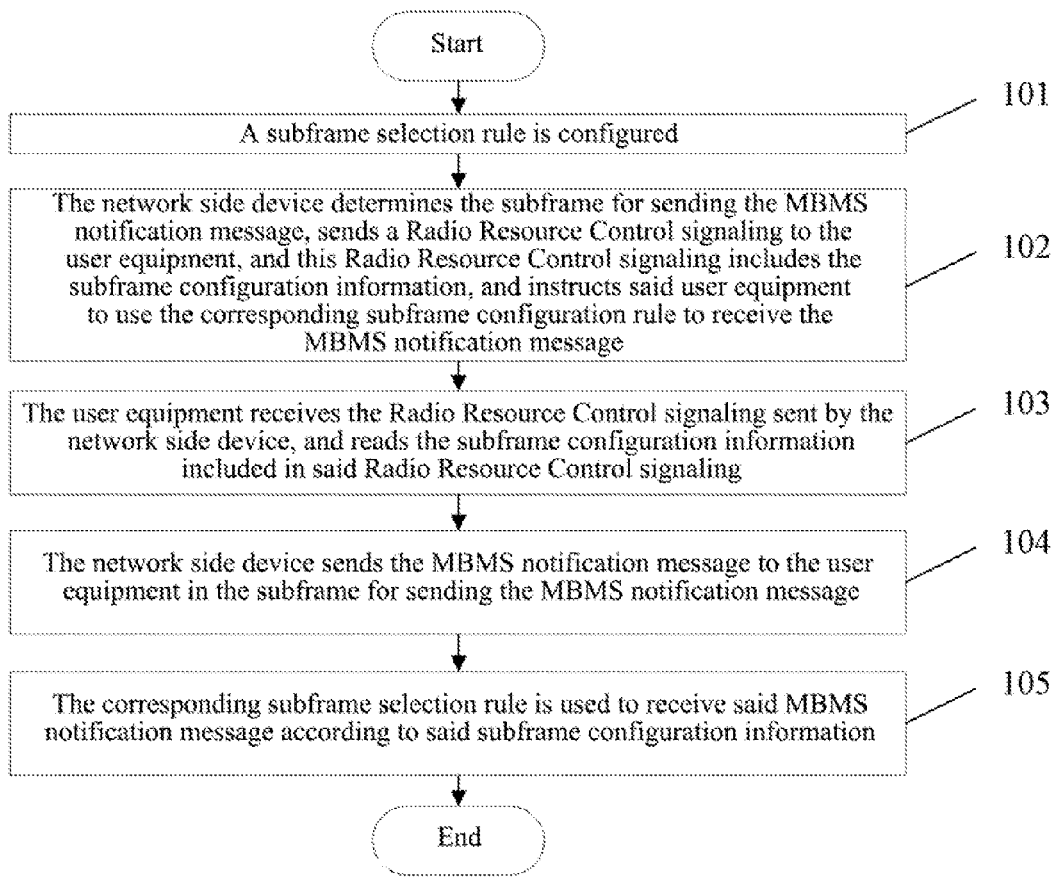
FIG. 1 is a flow chart of the method for sending the MBMS notification message and the method for receiving the MBMS notification message provided in the example of the present invention.

For a user equipment (for example a UE) which has already received the MCCH information, it is unnecessary to receive the unchanged MCCH information every time, and since the amount of the MCCH information is large and the process of receiving and analyzing the MCCH information consumes more power, thus it will cause high power consumption in the user equipment. Therefore, adding a MBMS notification message is proposed to use a small amount of information to describe whether the MCCH message changes, such that the user equipment in the idle mode is only required to monitor the MBMS notification message and determines whether to receive the MCCH message according to the MBMS notification message.

The MBMS notification message and the system paging information are similar, and the LTE paging mechanism is implemented by sending the paging message, and the user equipment which has been resided in the cell, for example the User Equipment (UE), find out whether there is paging information for itself by monitoring the paging message; the location where the UE monitors the paging message is called as the Paging Occasion, and the PO is one subframe in the time domain; for a certain UE, only one subframe location is its PO location in a paging period, and this particular location is related to the International Mobile Subscriber Identity (IMSI) of the user equipment and the length of the paging period, which is implemented in constrain by a fixed algorithm. The UE in the idle mode will detect the paging message at the PO which belongs to the UE in each paging period. Namely, in the paging period, the network side sends the paging message to the user equipment at the PO, and the user equipment detects its paging message at this PO, and the particular location of the PO is obtained by the network side and the user equipment in advance.

When the user equipment enters a new MBMS over a Single Frequency Network (MBSFN) area due to just being powered on or its mobility, the user equipment will read MCCH information in the current area; subsequently, the network side notifies the user equipment which has obtained the MCCH information but not received the MBMS service that the MCCH information changes by sending the MBMS notification message, and only when does the user equipment begin to receive the MCCH information; otherwise the user equipment will not read the unchanged the MCCH information.

Adopting the MBMS notification message is able to save the network resources and the power of the user equipment, but there is no mechanism of transmitting the MBMS notification message currently yet, and in order to solve the problem that there is no MBMS notification transmission mechanism, the examples of the present invention provide a method for receiving the MBMS notification message and a method for sending the MBMS notification message.

One MCCH modification period (the period of the MCCH information changing) includes n (n is an integer more than 1) MCCH repeat periods (the period of sending the MCCH information). It is required to ensure that the MBMS notification message is sent at least once in each repeat period, and the MBMS notification message can be sent a plurality of times in one MCCH modification period so as to improve the reliability of the MBMS notification message.

It will describe the examples of the present invention with reference to figures below.

The process of completing the MBMS notification message transmission by adopting the method for receiving the MBMS notification message and the method for sending the MBMS notification message provided by the example of the present invention is as shown in FIG. 1, and comprises:

step 101, a subframe selection rule is configured;

in the example of the present invention, the network side device particularly is the Evolved Node B (E-NodeB), and the user equipment particularly is the UE.

One radio frame includes 10 subframes. For a Frequency Division Duplex (FDD) system, the PO location may be the 0th, 4th, 5th, 9th subframes in one radio frame; for a Time Division Duplex (TDD) system, the PO location could be the 0th, 1st, 5th, 6th subframes in one radio frame.

In this step, the subframe selection rule is configured, and the subframe selection rule includes the default subframe selection rule, the fixed subframe selection rule and the dynamic subframe selection rule, and said subframe could be the PO or non PO subframe.

The default subframe selection rule particularly is if said Radio Resource Control signaling does not include the subframe configuration information, then the default subframe is used to receive the MBMS notification message, and the default subframe can be manually designated before the system is initialized, and can be a unicast subframe or a MBSFN subframe, for example the first MBSFN subframe bearing MCCH information.

The fixed subframe selection rule particularly is to select a corresponding subframe to receive said MBMS notification message from locally pre-configured fixed subframes according to subframe configuration information; the user equipment can reserve a plurality of fixed subframe selection schemes, for example a certain non PO subframe of the first radio frame in each MCCH repeat period (for example the first non PO subframe, or the #1 subframe of the first radio frame in each MCCH repeat period, or the first MBSFN subframe bearing the MCCH in the first radio frame of each minimal MCCH repeat period).

The dynamic subframe selection rule particularly is to receive said MBMS notification message in the subframe included in said subframe configuration information, namely the subframe configuration information includes information of the particular subframe, such as the #1 subframe of the #7 radio frame is used to receive the MBMS notification message. The subframe configuration information including the dynamic subframe selection rule is transmitted by the system message.

After constituting the subframe configuration rule, a serial number can be allocated to the subframe configuration rule, for example, the serial number 0 is allocated to the default subframe selection rule, the serial number 1 is allocated to the fixed subframe selection rule of a certain non PO subframe such as the first non PO subframe in the first radio frame in each MCCH repeat period, the serial number 2 is allocated to the fixed subframe selection rule of the #2 subframe of the first radio frame in each MCCH repeat period, and the serial number 3 is allocated to the subframe selection rule of the first subframe bearing the MCCH in the first radio frame of each MCCH repeat period.

Step 102, the network side device determines the subframe used to send the MBMS notification message, sends Radio Resource Control signaling to the user equipment, and this Radio Resource Control signaling includes the subframe configuration information, and instructs said user equipment to use the corresponding subframe configuration rule to receive the MBMS notification message;

in this step, the network side device determines the subframe used to send the MBMS notification message, and further determines the used subframe selection rule, and instructs the user equipment to receive the MBMS notification message according to the corresponding subframe selection rule by including the subframe configuration information in Radio Resource Control Signaling.

Said Radio Resource Control signaling includes the BCCH message, the MCCH message, the RRC message, and MAC CE information.

Step 103, the user equipment receives the Radio Resource Control signaling sent by the network side device, and reads the subframe configuration information included in said Radio Resource Control signaling;

in this step, the user equipment receives the system message sent by the network side device, and according to the serial number of the subframe selection rule included in this sytem message, selects the corresponding fixed subframe from the local, and determines to use this fixed subframe to receive the MBMS notification message.

Step 104, the network side device sends the MBMS notification message to the user equipment in the subframe used to send the MBMS notification message;

in this step, the network side device sends the MBMS notification message to the user equipment in the subframe selected in the step 102.

Step 105, the corresponding subframe selection rule is used to receive said MBMS notification message according to said subframe configuration information;

in this step, the user equipment monitors and receives the MBMS notification message in the corresponding subframe of each MCCH repeat period according to the subframe selection rule determined in the step 103.

It should be noted that for the step 102, if Radio Resource Control signaling received by the user equipment does not include the subframe configuration information, the user equipment uses the default subframe selection rule, and receives the MBMS notification message in the system default configured subframe; if the Radio Resource Control signaling received by the user equipment includes the particular subframe, e.g. the 3# subframe of the 7# radio frame, the user equipment is awakened in the 3# subframe of the 7# radio frame, and monitors and receives the MBMS notification message.

Besides the subframe occupied by the MBMS notification message can be the PO or non PO subframe. If it is sent in the PO, the UE in the idle mode detects the MBMS notification message in its belonged PO in each paging period, and the UE in the idle state will automatically be awakened to detect the paging message at the corresponding PO and the MBMS notification message as well, which can reduce the extra times of awakening the UE. At the same time, considering the appearing frequency of the MBMS notification message is lower than that of the paging message, and in order to reduce the resources occupied by the MBMS notification message, the particular configuration of the PO subframe bearing the MBMS notification message can be designated in the Radio Resource Control signaling, such as the MBMS notification message is sent in the PO of the first radio frame of each MCCH repeat period.

The method for transmitting a MBMS notification message provided by the example of the present invention is: configuring a subframe selection rule in advance, and the network side determining the subframe used to send the MBMS notification message, and notifying the subframe configuration information for use by the MBMS notification message to the user equipment by the Radio Resource Control signaling; the network side device sending the MBMS notification message in the subframe for use by the MBMS notification message, and the user equipment selecting the corresponding subframe selection rule, receiving the MBMS notification message according to this rule, thereby implementing the transmission of the MBMS notification message, and solving the problem that there is no MBMS notification message transmission mechanism; since the subframe configuration information could only be a serial number and the particular subframe selection rule is stored in the user equipment, a small amount of information is generated when instructing the user equipment to use the corresponding subframe selection rule, which can implement adjustment of the subframe used by the user equipment to receive the MBMS notification message in real time, and further improve the system efficiency.

Figure 2:
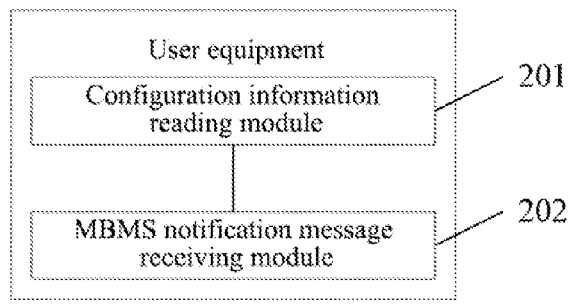
FIG. 2 is a structure schematic diagram of the user equipment provided in the example of the present invention.

The example of the present invention also provides a user equipment, as shown in FIG. 2, and the user equipment comprises:

a configuration information reading module 201, which is used for receiving the Radio Resource Control signaling, and reading the subframe configuration information included in said Radio Resource Control signaling;

a MBMS notification message receiving module 202, which is used for using the corresponding subframe selection rule to receive said MBMS notification message according to said subframe configuration information.

Figure 3:
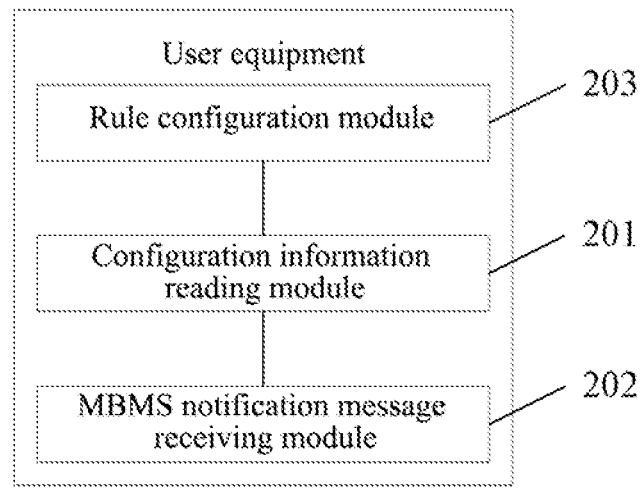
FIG. 3 is a structure schematic diagram of the user equipment provided in another example of the present invention.

Furthermore, said user equipment is as shown in FIG. 3, and further comprises:

a rule configuration module 203, which is used for configuring the default subframe selection rule, fixed subframe selection rule and dynamic subframe selection rule, and allocating serial numbers for said default subframe selection rule and said fixed subframe selection rule.

Said Radio Resource Control signaling particularly is the BCCH message, or the MCCH message, or the RRC message, or the MAC CE; said subframe is a unicast subframe or a MBSFN subframe.

Figure 4:
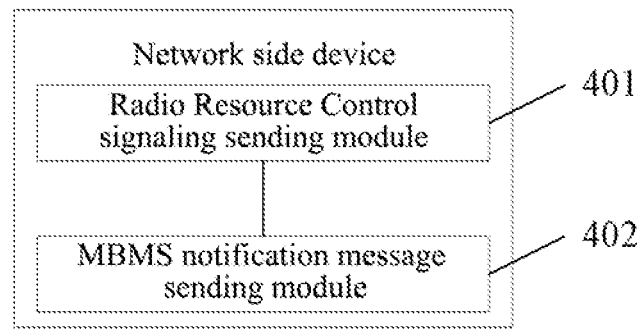
FIG. 4 is a structure schematic diagram of the network side device provided in the example of the present invention.

The example of the present invention also provides a network side device, as shown in FIG. 4, and the network side device comprises:

a Radio Resource Control signaling sending module 401, which is used for determining the subframe for sending the MBMS notification message, sending Radio Resource Control signaling to the user equipment, including the subframe configuration information in this Radio Resource Control signaling, and instructing said user equipment to use the corresponding subframe selection rule to receive the MBMS notification message;

a MBMS notification message sending module 402, is used for sending the MBMS notification message to the user equipment in the subframe for sending the MBMS notification message.

Figure 5:
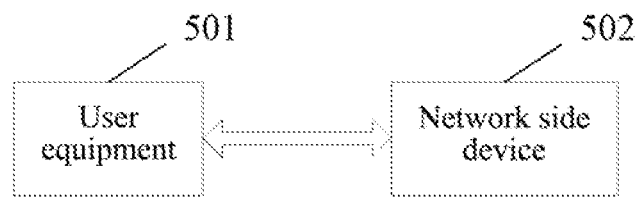
FIG. 5 is a structure schematic diagram of the system for transmitting the MBMS notification message provided in the example of the present invention.

The example of the present invention also provides a system for transmitting the MBMS notification message, and this system is as shown in FIG. 5, and comprises the user equipment 501 and the network side device 502;

said user equipment 501 is used for receiving the Radio Resource Control signaling sent by said network side device 502, reading the subframe configuration information included in said Radio Resource Control signaling, and using the corresponding subframe selection rule to receive said MBMS notification message according to said subframe configuration information;

said network side device 502 is used for determining the subframe for sending the MBMS notification message, sending the Radio Resource Control signaling to said user equipment 501, including subframe configuration information in this Radio Resource Control signaling, instructing said user equipment 501 to use the corresponding subframe configuration rule to receive the MBMS notification message, and sending the MBMS notification message to the user equipment 501 in the subframe for sending the MBMS notification message.

The above user equipment, network side device and the system for transmitting the MBMS notification message can combine with the method for sending and receiving the MBMS notification message provided by the example of the present invention, and the subframe selection rule is configured in advance, the network side determines the subframe for sending the MBMS notification message, and notifies subframe configuration information for use by the MBMS notification message to the user equipment by the Radio Resource Control signaling; the network side device sends the MBMS notification message in the subframe for use by the MBMS notification message, the user equipment selects the corresponding subframe selection rule, receives the MBMS notification message according to this rule, implements the transmission of the MBMS notification message, and solves the problem that there is not a MBMS notification message transmission mechanism.

A person having ordinary skill could understand all or parts of steps for implementing the above example method could be completed by instructing the related hardware by programs, said programs can be stored in a kind of computer readable storage medium, and when this program is executed, one of or the combination of the steps of the method examples are comprised.

Besides, each function unit in each example of the present invention can be implemented in the hardware form, and also can be implemented in the form of software function modules. If the integrated modules are implemented in a form of software function modules and are sold or used as separated products, the integrated modules also can be stored in a computer readable storage medium.

The above mentioned storage medium could be a read only storage, magnetic disk or CD and so on.

Above description is only the particular embodiment of the present invention, which is not used for limiting the protection scope of the present invention. Any modifications or substitutions which could be thought easily by the person skilled in the art within the technical scope disclosed by the present invention are all covered by the protection scope of the present invention. Therefore, the protection scope of the present invention should refer to the protection scope of the claims.

INDUSTRIAL APPLICABILITY

The present invention provides a method, apparatus and system for transmitting a MBMS notification message, where a subframe selection rule is pre-configured, and the network side determines the subframe for sending the MBMS notification message, and notifies the subframe configuration information for use by the MBMS notification message to the user equipment by the Radio Resource Control signaling; the network side device sends the MBMS notification message in the subframe for use by the MBMS notification message, and the user equipment selects the corresponding subframe selection rule, receives the MBMS notification message according to this rule, implements the transmission of the MBMS notification message, and solves the problem that there is not a MBMS notification message transmission mechanism.

What is claimed is:

1. A method for receiving a notification message, comprising:
receiving a Radio Resource Control signaling, reading subframe configuration information for a Multimedia Broadcast Multicast Service (MBMS) notification message included in said Radio Resource Control signaling; and
using a subframe selection rule corresponding to said subframe configuration information to receive said MBMS notification message;
wherein said subframe selection rule is a fixed subframe selection rule, a default subframe selection rule or a dynamic subframe selection rule;
before the step of receiving the Radio Resource Control signaling, and reading the subframe configuration information included in said Radio Resource Control signaling, said method for receiving the notification message further comprises:
when said subframe selection rule is said default subframe selection rule, configuring said default subframe selection rule as to use a default subframe to receive said MBMS notification message;
when said subframe selection rule is said fixed subframe selection rule, configuring said fixed subframe selection rule as to receive said MBMS notification message in a fixed subframe corresponding to said subframe configuration information;
when said subframe selection rule is said dynamic subframe selection rule, configuring said dynamic subframe selection rule as to receive said MBMS notification message in a subframe included in said subframe configuration information.

2. The method for receiving the notification message as claimed in claim 1, wherein
said subframe configuration information is a rule serial number;
before the step of receiving the Radio Resource Control signaling, and reading the subframe configuration information included in said Radio Resource Control signaling, said method for receiving the notification message further comprises:
when said subframe selection rule is said default subframe selection rule, allocating a serial number for said default subframe selection rule;
when said subframe selection rule is said fixed subframe selection rule, allocating a serial number for said fixed subframe selection rule.

3. The method for receiving the notification message as claimed in claim 1, wherein
the step of receiving said MBMS notification message comprises: using a unicast subframe or a Multicast Broadcast Single Frequency Network (MBSFN) subframe to receive said MBMS notification message, where said unicast subframe is a paging subframe or a non paging subframe.

4. The method for receiving the notification message as claimed in claim 3, wherein
said unicast subframe is a paging subframe, which is indicated by a system message;
said MBSFN subframe is a first subframe bearing a Multicast Control Channel (MCCH) in a MCCH repeat period.

5. The method for receiving the notification message as claimed in claim 1, wherein
said Radio Resource Control signaling is a Broadcast Control Channel (BCCH) message, or a Multicast Control Channel (MCCH) message, or a dedicated Radio Resource Control (RRC) message, or a Media Access Control (MAC) Control Element (CE).

6. A method for sending a notification message, comprising:
determining a subframe for sending a Multimedia Broadcast Multicast Service (MBMS) notification message, sending a Radio Resource Control signaling to a user equipment, including subframe configuration information in said Radio Resource Control signaling, and instructing said user equipment to use a subframe selection rule corresponding to said subframe configuration information to receive said MBMS notification message; and
sending said MBMS notification message to said user equipment in said subframe for sending said MBMS notification message;
wherein said subframe selection rule is a fixed subframe selection rule, a default subframe selection rule or a dynamic subframe selection rule;
said default subframe selection rule is to use a default subframe to receive said MBMS notification message;
said fixed subframe selection rule is to receive said MBMS notification message in a fixed subframe corresponding to said subframe configuration information;
said dynamic subframe selection rule is to receive said MBMS notification message in a subframe included in said subframe configuration information.

7. The method for sending the notification message as claimed in claim 6, wherein
said Radio Resource Control signaling is a Broadcast Control Channel (BCCH) message, or a Multicast Control Channel (MCCH) message, or a dedicated Radio Resource Control (RRC) message, or a Media Access Control (MAC) Control Element (CE); and
said subframe is a unicast subframe or a Multicast Broadcast Single Frequency Network (MBSFN) subframe.

8. A user equipment, comprising:
a configuration information reading module, configured to receive a Radio Resource Control Signaling, and read subframe configuration information included in said Radio Resource Control Signaling; and
a Multimedia Broadcast Multicast Service (MBMS) notification message receiving module, configured to use a subframe selection rule corresponding to said subframe configuration information to receive said MBMS notification message;

wherein said subframe selection rule is a fixed subframe selection rule, a default subframe selection rule or a dynamic subframe selection rule;

said default subframe selection rule is to use a default subframe to receive said MBMS notification message;

said fixed subframe selection rule is to receive said MBMS notification message in a fixed subframe corresponding to said subframe configuration information;

said dynamic subframe selection rule is to receive said MBMS notification message in a subframe included in said subframe configuration information.

9. A system for transmitting a notification message, comprising a user equipment and a network side device;

said user equipment being configured to receive a Radio Resource Control signaling sent by said network side device, read subframe configuration information included in said Radio Resource Control signaling, and use a subframe selection rule corresponding to said subframe configuration information to receive a Multimedia Broadcast Multicast Service (MBMS) notification message;

said network side device being configured to determine a subframe for sending said MBMS notification message, send said Radio Resource Control signaling to said user equipment, include said subframe configuration information in said Radio Resource Control signaling, and instruct said user equipment to use the subframe selection rule corresponding to said subframe configuration information to receive said MBMS notification message, and send said MBMS notification message to said user equipment in said subframe for sending said MBMS notification message, wherein said subframe selection rule is a fixed subframe selection rule, a default subframe selection rule or a dynamic subframe selection rule;

said default subframe selection rule is to use a default subframe to receive said MBMS notification message;

said fixed subframe selection rule is to receive said MBMS notification message in a fixed subframe corresponding to said subframe configuration information;

said dynamic subframe selection rule is to receive said MBMS notification message in a subframe included in said subframe configuration information.

* * * * *